Patented Mar. 14, 1950

2,500,714

UNITED STATES PATENT OFFICE 2,500,714

4-PHENYL-1-ALKYL ISONIPECOTIC ACID LACTONES

Marvin A. Spielman, Waukegan, Ill., assignor to Abbott Laboratories, North Chicago, Ill., a corporation of Illinois No Drawing. Application October 30, 1944, Serial No. 561,171

9 Claims. (Cl. 260—294)

The present invention relates to new therapeutic products and particularly to products characterized by analgesic properties.

The products of my invention may be represented by the following general formula:

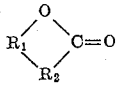

in which $R_1$ is a benzene ring with two adjacent carbon atoms common to the furanone ring; and $R_2$ is a piperidine ring with a single carbon atom common to the furanone ring; $R_1$ and $R_2$ having no unduly toxic substituents.

The basic structure of the compounds of the present invention is known in the art as a derivative of isonipecotic acid. These compounds are all substituted isonipecotic acid lactones formed by the introduction of an o-hydroxyaryl group into isonipecotic acid. They are basic in reaction and form crystalline salts with the common acids. For example the compound called 4-(6'-hydroxy-3'-methylphenyl)-1-methyl-isonipecotic acid lactone hydrochloride has the formula:

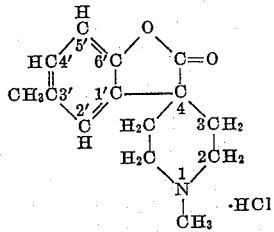

In the preparation of compounds having the same ring skeleton as isonipecotic acid, the starting materials are a di-($\beta$-halogenalkyl)-amine and an aryl acetonitrile, containing one alkoxy group in the ortho position and any other desired substituents elsewhere on the benzene ring. These two compounds in the presence of sodamide react with elimination of two molecules of hydrogen halide to form the corresponding 4-arylpiperidine-4-carboxylic acid nitriles having the general formula:

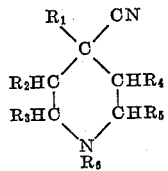

where $R_1$ is an aryl group containing at least one alkoxy group in a position ortho to the piperidine ring; and $R_2$, $R_3$, $R_4$, $R_5$, and $R_6$ are H or alkyl groups.

Treatment of the nitrile with a concentrated aqueous solution of a hydrogen halide by refluxing several hours yields the desired isonipecotic acid lacetone. Conversion of the nitrile to the lactone may also be effected by treatment with alkali followed by treatment with acid. The lactones have the following formula:

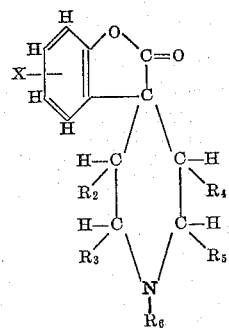

in which X denotes a non-toxic substituent for one or more of the hydrogens of the ring, such as alkyl or halogen.

The isonipecotic acid lactones have been found to possess analgesic properties. They are usually administered as the salts made by reacting the lactones with an acid such as hydrochloric acid. The salt may be given orally in tablet or capsule form, or made into a solution and given orally or parenterally.

The following examples are given as illustrations of the invention:

EXAMPLE I (a) *2-methoxy-5-methylphenylacetonitrile*

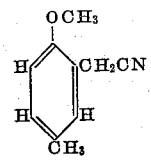

One hundred seventy-five grams of commercial formalin was saturated with hydrogen chloride and added dropwise with stirring to 70 g. zinc chloride (g.=grams), 250 cc. petroleum ether, 200 cc. of 35% hydrochloric acid, and 400 g. of p-cresyl methyl ether. The temperature was maintained at 0°–5° C. until addition was complete, then allowed to rise slowly to room temperature. The two layers were separated. The lower layer was rejected and the upper layer was washed thoroughly and evaporated to a syrup under diminished pressure. This syrupy residue was stirred and refluxed overnight with 400 g. sodium cyanide, 400 cc. water, and two liters of acetone. Most of the acetone was boiled off. The mixture was diluted, extracted with ether and distilled. The yield was 288 g., boiling point 109°–110° C. under a pressure of about 3 mm.

(b) *4-(6'-methoxy-3'-methylphenyl)-1-methylisonipecotonitrile*

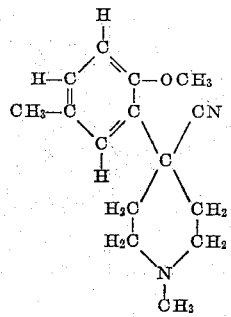

To 400 cc. of liquid ammonia contained in a flask was added 0.1 g. of ferric nitrate (as a catalyst) and then to this solution was added gradually a total of 25 g. of sodium which had been cut into small pieces. The excess ammonia was allowed to evaporate as 200 cc. of toluene was added.

One hundred grams of bis-(β-chloroethyl)-methylamine hydrochloride was placed in a 500 cc. flask, covered with 200 cc. of ether and then 100 cc. of 50% sodium hydroxide was added. The contents of the flask were agitated several minutes and then allowed to separate into two layers. The upper layer which was an ether solution of bis (β-chloroethyl) methylamine was separated; 100 cc. of benzene was added and the solvent was then rapidly removed by evaporation in vacuo with caution to keep the temperature below 30° C. The free base was left as an oil.

In a 3-neck flask fitted with a stirrer and reflux condenser was placed the freshly liberated base from 100 g. bis(β-chloroethyl)-methylamine hydrochloride (prepared as described in the previous paragraph), 80 g. of 2-methoxy-5-methylphenylacetonitrile and 500 cc. toluene. The sodamide (prepared as described in the first paragraph) was added in portions with stirring as the reaction proceeded at 40°–55° C. At the end, the mixture was boiled for one hour.

The cooled toluene solution was washed once with water, then extracted with 10% hydrochloric acid. The aqueous layer was made alkaline, the basic precipitate was extracted with ether and finally distilled in vacuo. The product boiled at 150°–155° C. under a pressure of 3 mm. The yield was 40%–60% of a very viscous colorless liquid. Scratching induced crystallization. The solid melted at 63°–64° C. after recrystallization from petroleum ether.

(c) *4'6'-hydroxy-3'-methylphenyl)-1-methyl isonipecotic acid lactone*

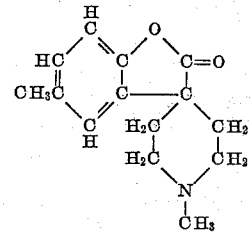

Fifty-eight grams of 4-(6'-methoxy-3'-methylphenyl)-1-methylisonipectonitrile was boiled over-night under a reflux condenser with 200 cc. constant boiling hydrobromic acid. Most of the acid was removed in vacuo; the residue was covered with ether and shaken with an excess of aqueous sodium carbonate. The ether solution of the free base was roughly dried over sodium sulfate and an excess of ethereal hydrogen chloride was added. The hydrochloride salt came down at once and soon crystallized. It was recrystallized from absolute alcohol; melting point 269°–271° C.

The free base melted at 83°–84° after crystallization from ether.

The hydrobromide, which was prepared by treating the base with hydrogen bromide in a manner similar to that used in preparing the hydrochloride, melting at 265°–268° C.

The analgesic dose of the hydrochloride for adult humans is 50 mg. to 200 mg. It may be given orally in the form of tablets, capsules or solution, or parenterally in aqueous solution.

EXAMPLE II

If the 2-methoxy-5-methylphenylacetonitrile used in Example I is replaced by o-methoxyphenylacetonitrile the product obtained will be 4-(6'-hydroxyphenyl)-1-methylisonipecotic acid lactone which forms a hydrochloride melting at 258°–259° C., and which has the following structural formula:

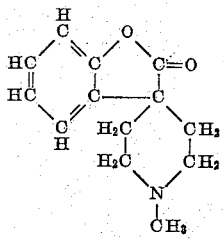

This compound has been tested on experimental animals and found to exert an analgesic effect in a dosage of 700 mg. per kilogram, while the minimum lethal dose for 50% mortality is 1500 mg. per kg.

EXAMPLE III

If the 2-methoxy-5-methylphenylacetonitrile used in Example I is replaced by 2,3-dimethoxyphenylacetonitrile and the procedure of Example I is followed, there is first obtained the corresponding 3-hydroxy compound which may be treated with acetic anhydride to produce, 4-(5'-acetoxy-6'-hydroxyphenyl)-1-methylisonipecotic acid lactone which forms a hydrochloride melting at 250°–251° C., and which has the following structural formula:

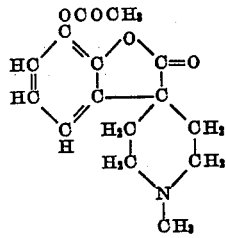

The dosage for the hydrochloride of this compound is the same as for Example II.

EXAMPLE IV

If the 2-methoxy-5-methylphenylacetonitrile used in Example I is replaced by 2-methoxy-5-ethylphenylacetonitrile the product obtained will be 4-(3'-ethyl-6'-hydroxyphenyl)-1-methylisonipecotic acid lactone which forms a hydrochloride melting at 246°–248° C., and which has the following structural formula:

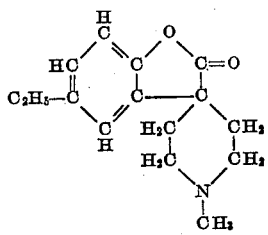

For mice, the analgesic dose of the hydrochloride is 50 mg. per kilo of body weight. The M. L. D. dose is 100 mg. per kilo of body weight. The expression "M. L. D. 50" means dose which kills approximately 50 per cent of the animals tested.

EXAMPLE V

If the 2-methoxy-5-methylphenylacetonitrile used in Example I is replaced by 2-methoxy-5-n-propyl acetonitrile the product obtained will be 4-(6'-hydroxy-3'-n-propylphenyl)-1-methylisonipecotic acid lactone which forms a hydrochloride melting at 258°–260° C., and which has the following structural formula:

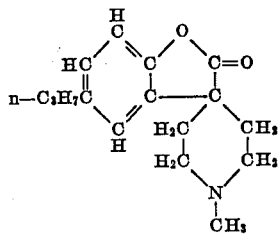

For mice, the analgesic dose of the hydrochloride is 75 mg. per kilo of body weight. The M. L. D. dose is 150 mg. per kilo of body weight.

EXAMPLE VI

If the 2-methoxy-5-methylphenylacetonitrile used in Example I is replaced by 2-methoxy-5-chlorophenylacetonitrile the product obtained will be 4-(3'-chloro-6'-hydroxyphenyl)-1-methyl isonipecotic acid lactone which forms a hydrochloride melting at 285°–288° C., and which has the following structural formula:

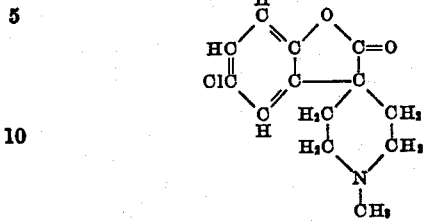

For mice, the analgesic dose of the hydrochloride is 200 mg. per kilo of body weight. The M. L. D. dose is 400 mg. per kilo of body weight.

EXAMPLE VII

If the bis-($\beta$-chloroethyl) methylamine is replaced by bis-($\beta$-chloroethyl)-ethylamine, in Example I, the product obtained will be 4-(6'-hydroxy-3'-methylphenyl)-1-ethylisonipecotic acid lactone which forms a hydrochloride melting at 262°–263° C. and which has the following structural formula:

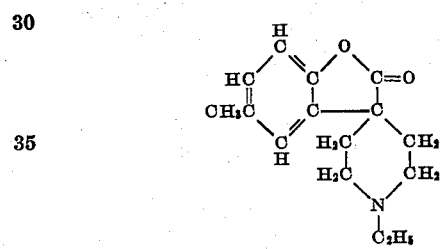

The hydrochloride of this compound has been administered to adult humans. A good analgesic effect with no deleterious effects is secured with a dose of 100 mg.

EXAMPLE VIII (a) 1-benzoyl-4-(6'-methoxy-3'-methylphenyl)-isonipecotonitrile

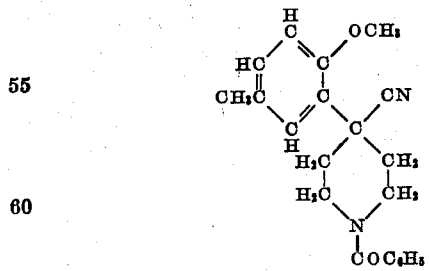

In a 1-liter flask equipped as in Example I was placed 110 g. N-bis($\beta$-chloroethyl) benzamide, 400 cc. toluene and 60 g. of 2-methoxy-5-methylphenylacetonitrile. The sodamide from 23 g. of sodium was added in portions as the reaction was allowed to proceed at 40°–50° C. The mixture was finally refluxed for two hours, then concentrated to a syrup in vacuo. Dilution with 300 cc. of ether and scratching caused the separation of 32 g. of product; melting point 118°–120° C. When purified as by recrystallization from alcohol, the melting point rose to 126°–128° C.

(b) 4-(6'-hydroxy-3'-methylphenyl)-isonipecotic acid lactone

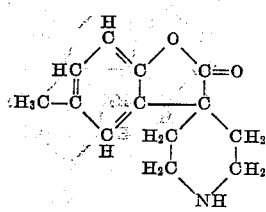

Thirty grams of the above nitrile was boiled under a reflux condenser for 12 hours with 150 cc. of constant boiling hydrobromic acid. It was evaporated to a paste in vacuo, covered with 200 cc. of ether and made alkaline by violent agitation with an excess of sodium carbonate solution. The basic portion in the ether was converted to the hydrochloride by addition of ethereal hydrogen chloride after crystallization from ethanoldioxan, it melted at 164° C.

This compound produces analgesia in mice with a dosage of 75 mg. per kg. of body weight and the minimum lethal dose for 50% mortality is 150 mg. per kg.

(c) The above product was conveniently converted to 4-(6'-hydroxy-3'-methylphenyl-1-methylisonipecotic acid lactone (the product of Example I) by methylation of the nitrogen atom by boiling 25 g. overnight with 12 cc. formalin and 50 cc. formic acid. The mixture was concentrated to a syrup, treated with sodium carbonate under ether, and converted to the hydrochloride by ethereal or alcoholic hydrogen chloride.

EXAMPLE IX

Sulfate of 4-(6'-hydroxy-3'-methylphenyl)-1-methylisonipecotic acid lactone

By treating the free base with ethereal sulphuric acid (in a manner similar to that described in Example I (c) for preparing the hydrochloride) the crystalline sulfate is obtained, being the addition salt of the lactone and sulfuric acid. It melts at 199°–200° C.

Without further elaboration, the foregoing will so fully explain my invention that others may readily adapt the same for use under various conditions of service.

It will, for instance, be obvious that suitable addition compounds other than those specifically set forth in detail herein may be produced without invention. For the purposes of this specification, an addition compound of piperidine is defined as a compound formed by the union of piperidine with another group of atoms, without apparent alteration or rupture of the piperidine ring or any other part of the larger molecule in which said ring is included, said other group of atoms being capable of existing as an independent and complete molecule by itself.

I claim:

1. Isonipecotic acid lactone compounds and acid addition products thereof in which the lactone compounds containing one benzene ring and one piperidine ring are represented by the following general formula:

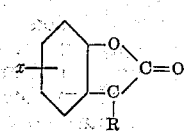

in which $x$ is a member of the group consisting of hydrogen, hydroxy, acetoxy, alkyl, and halogen, and R represents a piperidine ring with the $\gamma$-carbon atom common to the furanone ring.

2. A compound selected from the group consisting of 4-(6'-hydroxy-3'-alkylphenyl)-1-alkyl-isonipecotic acid lactones and acid salts thereof.

3. A compound selected from the group consisting of 4-(6'-hydroxy-3'-halophenyl)-1-alkyl-isonipecotic acid lactones and acid salts thereof.

4. A member selected from the group consisting of the compound 4-(6'-hydroxy-3'-methylphenyl)-1-methylisonipecotic acid lactone which has the formula

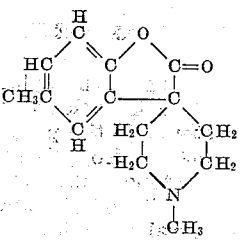

and acid salts thereof.

5. The compound 4-(6'-hydroxy-3'-methylphenyl)-1-methylisonipecotic acid lactone hydrochloride represented by the formula

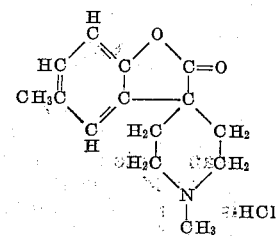

6. A member selected from the group consisting of the compound 4-(3'-chloro-6'-hydroxyphenyl)-1-methylisonipecotic acid lactone which is represented by the formula

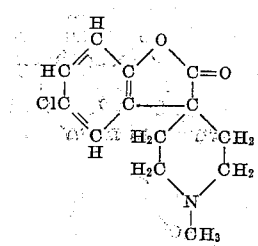

and acid salts thereof.

7. The compound 4-(3'-chloro-6'-hydroxyphenyl)-1-methylisonipecotic acid lactone hydrochloride which is represented by the formula

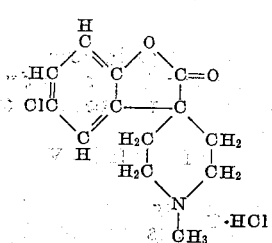

8. A member selected from the group consisting of the compound 4-(6'-hydroxy-3'-methylphenyl)-1-ethylisonipecotic acid lactone which is represented by the formula

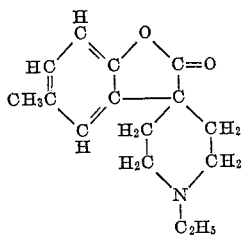

and acid salts thereof.

9. The compound 4-(6'-hydroxy-3'-methylphenyl)-1-ethylisonipecotic acid lactone hydrochloride which is represented by the formula

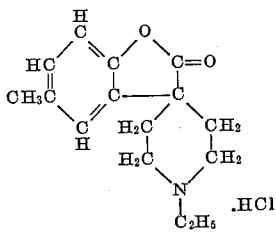

MARVIN A. SPIELMAN.

REFERENCES CITED

The following references are of record in the file of this patent:

UNITED STATES PATENTS

| Number | Name | Date |
|---|---|---|
| 2,044,015 | Perkins et al. | June 16, 1936 |
| 2,167,351 | Eisleb | July 25, 1939 |

OTHER REFERENCES

Bergel et al., J. Chem. Soc., June 1944, pages 261–269.